US010169780B2

(12) United States Patent
Freer

(10) Patent No.: US 10,169,780 B2
(45) Date of Patent: Jan. 1, 2019

(54) SYSTEM AND METHOD FOR TRANSMITTING AND RECEIVING MULTIMEDIA CONTENT

(71) Applicant: Robert B. Hubbard, Florence, KY (US)

(72) Inventor: Carl J. Freer, Thursley (GB)

(73) Assignee: Robert B. Hubbard, Pasadena, CA (US)

( * ) Notice: Subject to any disclaimer, the term of this patent is extended or adjusted under 35 U.S.C. 154(b) by 294 days.

(21) Appl. No.: 14/669,478

(22) Filed: Mar. 26, 2015

(65) Prior Publication Data

US 2016/0283982 A1    Sep. 29, 2016

Related U.S. Application Data

(62) Division of application No. 11/202,665, filed on Aug. 11, 2005, now abandoned.

(51) Int. Cl.
*H04W 4/24* (2018.01)
*G06Q 30/02* (2012.01)
(Continued)

(52) U.S. Cl.
CPC ..... *G06Q 30/0267* (2013.01); *G06Q 30/0264* (2013.01); *H04L 67/325* (2013.01);
(Continued)

(58) Field of Classification Search
None
See application file for complete search history.

(56) References Cited

U.S. PATENT DOCUMENTS 6,609,004 B1 * 8/2003 Morse ................. G01S 5/0027
455/456.5
6,859,077 B1 * 2/2005 Huang .................. G05F 1/468
327/143

(Continued)

*Primary Examiner* — Colleen A Hoar
(74) *Attorney, Agent, or Firm* — William J. Benman; Benman, Brown & Williams

(57) ABSTRACT

A system for providing multimedia content. The system includes means for transmitting targeted multimedia content to customers via a telecommunications network; and automatically receiving and outputting the content on a mobile platform. In the illustrative embodiment, the system includes means for encoding, compressing and storing content on a server. An applet is transmitted from the server to each mobile platform. When executed at the mobile platform, the applet deciphers the content and retrieves a schedule with a playback time. The content is then played out without interrupting the user. The applet may include credit code which adds time to a SIM card on the mobile platform giving a user credit time to use the device for one or more functions (communication, games, etc.) at no additional charge. The applet may also include a bar code which when displayed to a third party vendor, allows the user to receive a discount on purchases of goods or services related to the ad. In the best mode, the mobile platform includes a cellular transceiver adapted for a GSM or CDMA network. The mobile platform stores data relating to the output of the content and sends this data on command back to the server. The server includes code for forwarding this feedback data to advertisers.

18 Claims, 2 Drawing Sheets

(51) Int. Cl.
*H04L 29/08* (2006.01)
*H04M 17/00* (2006.01)

(52) U.S. Cl.
CPC ............ *H04L 67/34* (2013.01); *H04M 17/20* (2013.01); *H04M 17/202* (2013.01); *H04M 17/204* (2013.01); *H04W 4/24* (2013.01)

(56) References Cited

U.S. PATENT DOCUMENTS

| | | | | |
|---|---|---|---|---|
| 7,024,453 B2* | 4/2006 | Stern | ...................... | G06Q 30/02 705/27.1 |
| 2001/0032193 A1* | 10/2001 | Ferber | .................. | G06Q 20/027 705/79 |
| 2002/0072972 A1* | 6/2002 | Lamont | .................. | G06Q 30/02 705/14.55 |
| 2002/0087661 A1* | 7/2002 | Matichuk | .................. | B60P 3/34 709/218 |
| 2002/0194062 A1* | 12/2002 | Linde | ...................... | G06Q 30/02 705/14.52 |
| 2003/0003929 A1* | 1/2003 | Himmel | .................. | H04L 29/06 455/466 |
| 2003/0028565 A1* | 2/2003 | Landsman | ............. | G06Q 30/02 715/234 |
| 2003/0055735 A1* | 3/2003 | Cameron | ................ | G06Q 20/04 705/27.1 |
| 2003/0149601 A1* | 8/2003 | Cabral | .................. | G06Q 10/02 705/5 |
| 2003/0154128 A1* | 8/2003 | Liga | .................. | G06Q 30/0208 705/14.11 |
| 2004/0068536 A1* | 4/2004 | Demers | ............. | G06F 17/30899 709/201 |
| 2004/0268413 A1* | 12/2004 | Reid | ...................... | G06Q 30/02 725/131 |
| 2005/0042983 A1* | 2/2005 | Borgward | ............... | G06F 21/10 455/3.06 |
| 2005/0120050 A1* | 6/2005 | Myka | .................. | G06F 17/30067 |
| 2005/0198207 A1* | 9/2005 | Hoblit | .................... | G06Q 30/00 709/219 |
| 2005/0289002 A1* | 12/2005 | Mathis, Jr. | ............. | G06Q 30/00 705/14.73 |
| 2006/0203919 A1* | 9/2006 | Hamilton | ......... | H04N 21/23608 375/240.26 |
| 2006/0230415 A1* | 10/2006 | Roeding | ................ | H04N 7/173 725/34 |
| 2009/0132377 A1* | 5/2009 | Thompson | ............. | G06Q 30/02 705/14.69 |
| 2015/0019307 A1* | 1/2015 | Girard | ................ | G06Q 30/0267 705/14.12 |

* cited by examiner

SYSTEM AND METHOD FOR TRANSMITTING AND RECEIVING MULTIMEDIA CONTENT

REFERENCE TO COPENDING APPLICATION

This is a divisional application with respect to U.S. patent application Ser. No. 11/202,665 filed Aug. 11, 2005 by Carl Johan Freer and entitled METHOD FOR ADVERTISING, the teachings of which are hereby incorporated herein by reference.

BACKGROUND OF THE INVENTION

Field of the Invention

The present invention relates to electrical and electronic systems. More specifically, the present invention relates to systems and methods for transmitting, receiving and outputting multimedia content.

Description of the Related Art

For many applications there is a need for a system and method for transmitting, receiving and automatically outputting multimedia content. Advertising is one such example. Conventional advertising practices include the use of print media (e.g. newspapers, magazines, direct mail etc.), television, radio and the Internet. Each approach has its shortcomings and limitations. Many perceive television to be the most important medium inasmuch as it offers rich multimedia (audio/visual) content to what is perceived to be a captive audience. However, a television is not generally a portable appliance. Hence, the consumer spends only a limited amount of time viewing a television. This forces advertisers to compete for the relatively small window of time during which consumers are reachable via the medium. This drives up airtime costs to the extent that only those advertisers with the means reach the audience. The files thus presented are loosely based on general market profiles, viewing habits and/or demographics. Hence, the consumer is typically presented with untimely files that do not correlate well with the individual consumer's interests or preferences.

Radio files suffer from many of the same limitations as television, with the exception that the compelling video component is not present, but the device is often portable. In both cases, the files are untimely and not targeted based on individual consumer interests or preference. Further, the feedback to advertisers is limited through these media channels.

Print media, especially, newspapers and magazines lack compelling multimedia content, are not targeted based on preference, and do not provide feedback to advertisers as to the number of people that actually viewed an ad. Direct mail files suffer from the same shortcomings as newspapers and magazines with the additional consideration that direct mail is not invited and not well received.

Uninvited files are particularly endemic to web based advertising channels with pop-ups and spam being a bane of most user's web experience. Hence, files presented via spam and pop-ups are clearly not timely and typically not presented with rich, compelling multimedia content. While some advertiser feedback is provided in this medium, the files are not typically targeted based on the preferences of the individual user.

The above-referenced patent application by Carl Freer addresses the need in the art for an improved method for advertising that presents compelling multimedia files targeted to consumers based on their individual preferences in a timely and cost effective manner. What is needed then is a system and method for implementing the system taught by Freer.

SUMMARY OF THE INVENTION

The need in the art is addressed by the system and method of the present invention. Most generally, the inventive system includes means for transmitting multimedia content; and means for automatically receiving and outputting the content on a mobile platform.

In the illustrative embodiment, the system includes means for encoding, compressing and storing the content on a server. An applet is transmitted from the server to each mobile platform. When executed at the mobile platform, the applet deciphers the content and retrieves a schedule with a playback time. The file is then played out without interrupting the user.

The applet may include credit code which adds time to a SIM card on the mobile platform giving a user credit time to use the device for one or more functions (communication, games, etc.) at no additional charge. The server applies the credit code based upon information received in relation to the viewing of the advertisement.

The applet may also include a bar code supplied by the server which when displayed to a third party vendor, allows the user to receive a discount on purchases of goods or services related to the ad.

In the best mode, the mobile platform includes a cellular transceiver adapted for a GSM/GPRS, CDMA, TDMA or PCS or other suitable network. The mobile platform stores data relating to the output of the files and sends this data on command back to the server. The server includes code for forwarding this feedback data to advertisers.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
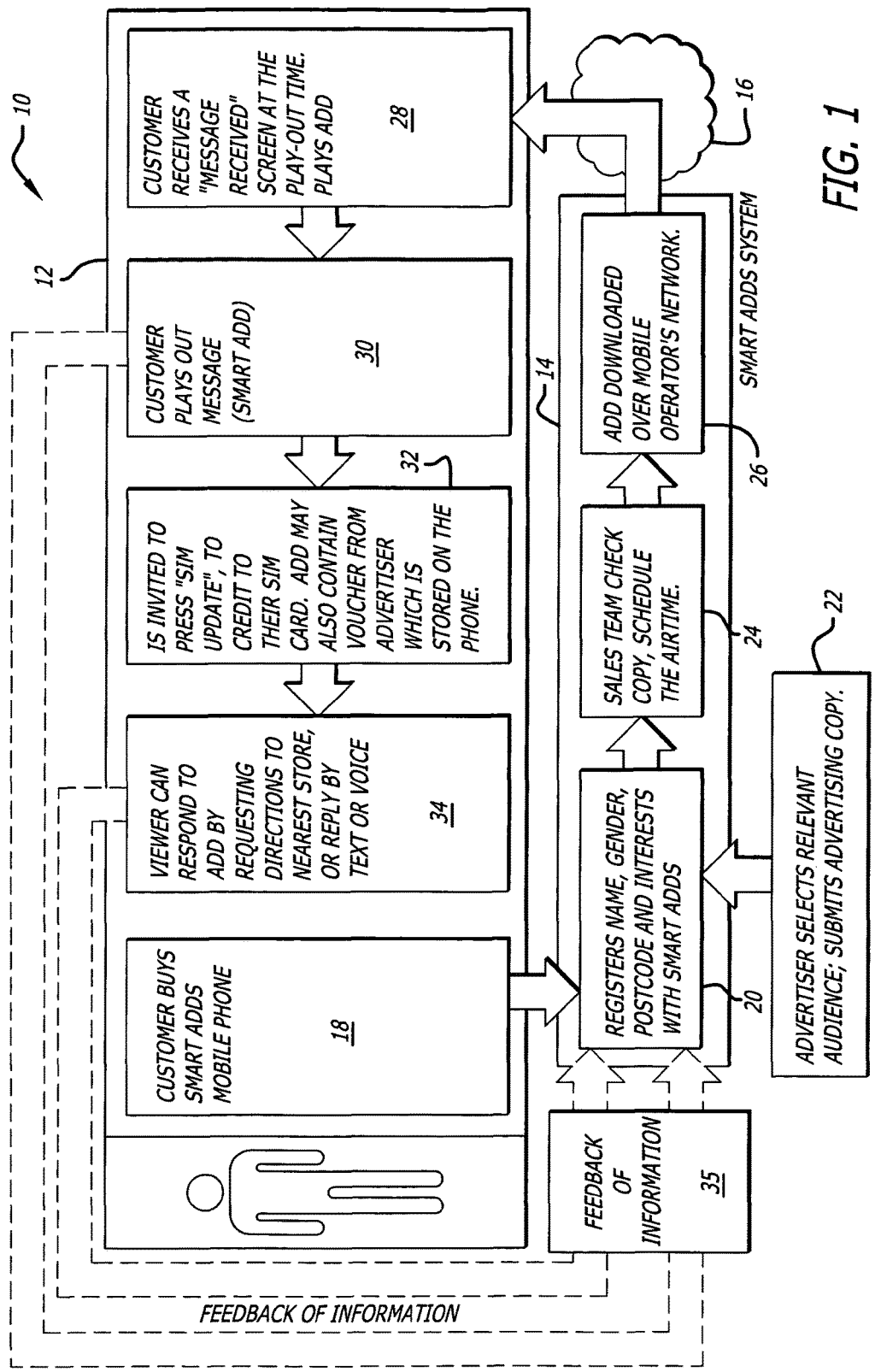
FIG. 1 is a diagram that shows an illustrative implementation of a method implemented in accordance with the teachings of the present invention.

FIG. 1 is a diagram, which shows an illustrative implementation of a method in accordance with the teachings of the present invention. As shown in FIG. 1, the method 10 is adapted to effect communication of multimedia files to a mobile device or platform 12 from a server system 14. In the best mode, the device 12 is a Gizmondo™ handheld communications and entertainment platform. (The Gizmondo is disclosed and claimed in U.S. patent application Ser. No. 10/945,271 filed Sep. 20, 2004 by Carl Johan Freer and entitled PORTABLE ELECTRONIC DEVICE, the teachings of which are incorporated herein by reference.) However, the invention is not limited thereto.

While the Gizmondo is preferred because of the powerful and robust design of the device, other devices may be used as well including handheld computers, Personal Digital Assistants, cell phones, etc. In general, what is required for the device 12 is a cellular transceiver, onboard processor (preferably at least 300 Mhz), memory, display, speakers and user interface. In addition, Global Positioning System (GPS) functionality is preferred.

Returning to FIG. 1, at step 18, a customer agrees to accept a predetermined number (e.g. 12) of high quality multimedia messages such as advertisements, referred to herein as 'Smart ADDS', in exchange for credits for free or discounted product (e.g. a device) or airtime and acquires a device configured to receive the advertisements. Hence, the ADDS are invited.

Next, at step 20, the user registers user information and preferences with the Smart ADDS server system 14. This may be provided via a website (not shown). Hence, before the phone is activated, in the illustrative embodiment, the user inputs name, gender, postal code and interests online. Preferably, the user provides verification of age, if claiming to be over 18 years old and desirous of receiving "age restricted ADDS"—such as beer and lager files.

This registration can be updated and refined via the website. In the preferred embodiment, the registration information is stored on the Smart ADDS system 14 (compliant with relevant laws) and employed in the selective transmission of Smart Adds so that the Smart Adds are targeted and delivered according to the registered user's age, gender, location other relevant or selected attributes and/or preferences. Further, the files may be selectively targeted based on the user's history with the device. If the user uses the device more for games, more game related files may be sent. If the user views more movies or listens to music more frequently, the user may be targeted to receive more entertainment-oriented files. In addition, the fees charged to advertisers may vary depending on the targeting of these files.

At step 22, advertisers select Smart ADDS audiences most relevant to their advertising campaign. The advertisers can specify the day and time for the commercial to play out on the devices. The advertisers agree to pay for the airtime and submit high quality multimedia advertising copy for distribution by the system 14. The files should be high quality, both technically (e.g. television quality at frame rates of at least 20 frames per second) and creatively. In the best mode, the files are rich with audio and video content and comply with the relevant legislation and codes of practice.

In the best mode, a system such as that disclosed and claimed in U.S. patent application Ser. No. 11/202,29, filed Aug. 11, 2005 by Carl Freer and Steve Carroll entitled SYSTEM AND METHOD FOR DISTRIBUTING MULTIMEDIA CONTENT VIA MOBILE WIRELESS PLATFORMS the teachings of which are hereby incorporated by reference herein. Nonetheless, the invention is not limited thereto. The inventive method may be practiced with any system capable of pushing rich multimedia content to, or pulling content from a server to, a mobile wireless platform without departing from the scope of the present teachings.

Figure 2:
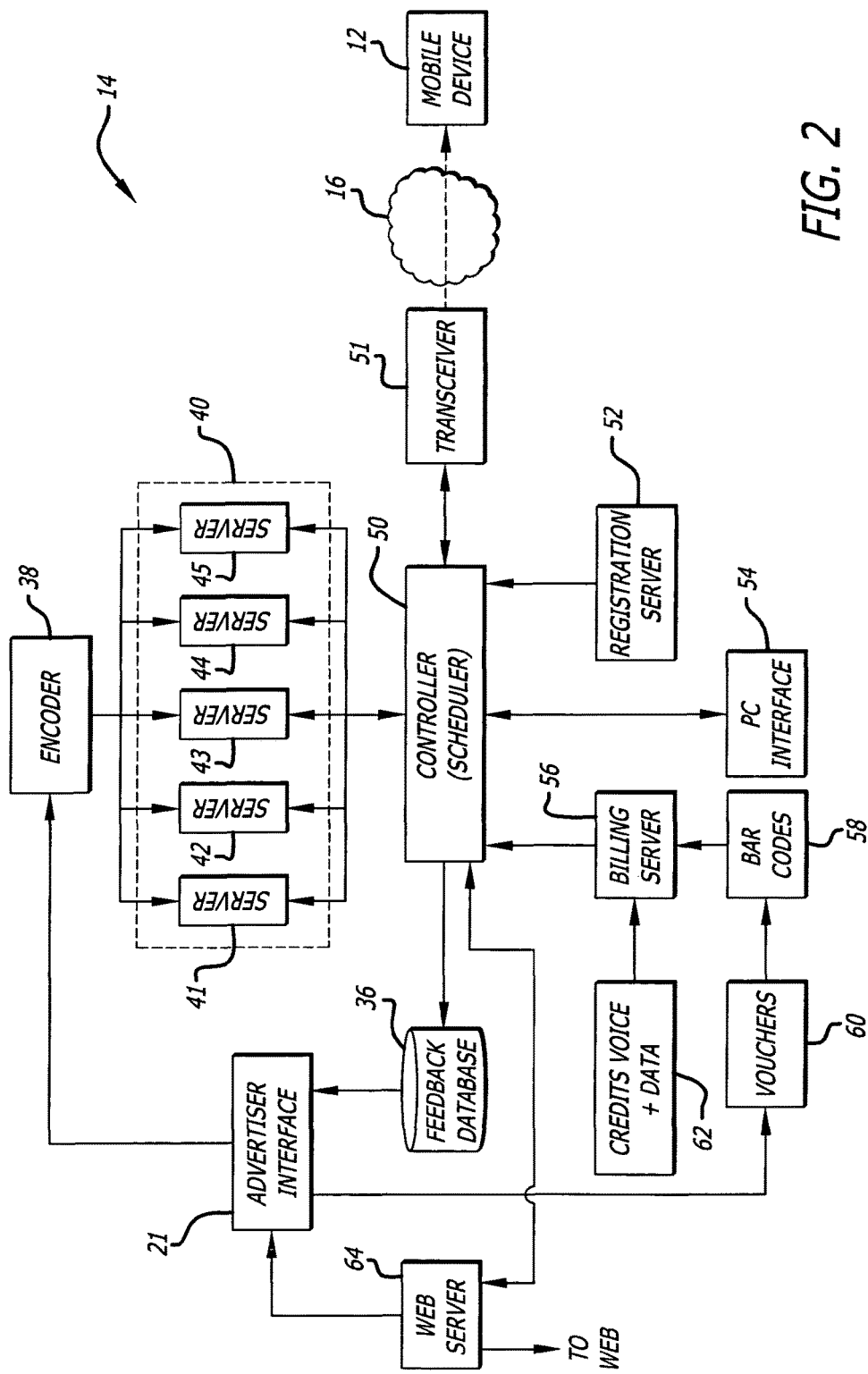
FIG. 2 is a block diagram showing an illustrative hardware implementation of a system in accordance with the present teachings.

FIG. 2 is a block diagram showing an illustrative hardware implementation of a system in accordance with the teachings of the present invention. As shown in FIG. 2, the system 14 includes an encoder 38, which receives multimedia content via an interface 21. The interface 21 may be a web interface. As an alternative, files may be provided via a disk or other means. The encoder 38 encodes and compresses the files and stores the files in an aggregation hub 40, a bank of content servers. In the preferred embodiment, the encoder 38 is adapted to compress a 10-30 second file in 150-300 kb packet.

The hub 40 is shown with five servers 41-45. However, those skilled in the art will appreciate that the invention is not limited to the number of servers used. The hub 40 is operationally coupled to a controller 50 which, in accordance with the present teachings, serves, inter alia, as a scheduler.

The system 14 further includes a feedback database for storing data relating to user responses to the files, a registration server 52, a PC user interface 54, a billing server 56, memory for storing vouchers 60 and credits 62, respectively, a bar code generator 58 and a web server 64.

Referring briefly to FIG. 1, at step 24, in the illustrative embodiment, a sales team verifies the copy and schedules airtime for transmission of each ad. The schedule is stored in memory in or accessible by the controller 50. The controller 50 transmits the files via a transceiver 51 to predetermined mobile units (of which only one unit 12 is shown in FIG. 2) in accordance with the schedule.

In the best mode, an applet is transmitted to each mobile unit along with each ad. The applet is a small program (written in C or C$^{++}$), compatible with the operating system of the device (e.g. Windows CE™, Windows ME™, Palm OS™, Symbian™, etc.) and includes code for decoding and decompressing each file on the mobile device. In addition, the applet extracts an XML file which includes the schedule. The schedule provides a time for the playback of the ad. The applet may also be used to upload the original registration detail, e.g., name, DOB, gender, zip/postcode, etc. to the server. Additional information and preferences can be added through a website. The user is asked to provide proof of age which is only mandatory when receiving age restricted ads such as those associated to alcohol and sex.

The applet can be embedded a) At source and sold with the mobile phone;
b) The applet can be downloaded over the air (OTA);
c) The applet can be downloaded via PC; or
d) The applet may reside on an open source codec with a Smart Adds proprietary algorithm.

In the illustrative embodiment, the schedule is requested by the device from the server on a daily basis. It resides in an XML file.

The files are preferably delivered in either http, https, for FTP format. The files are compressed prior to delivery to the mobile handset.

Prior to the dispatch of the schedule, the device 12 is sent an SMS message which is not apparent to the user. This interfaces the applet which wakes the device and retrieves the schedule. The file is transmitted via a wireless network provided by a wireless network operator or a Mobile Virtual Network Operator (MVNO) or any other licensed Network airtime provider and downloaded on the device 12 (along with the "play-out" instructions) well in advance of an included encoded scheduled play-out time. This step is depicted at step 26 in FIG. 1. Those skilled in the art will recognize that this allows the delivery of a file to be staggered relative to the play-out time for the file. The files can thus be timed to play-out simultaneously, at a particular time in a local or predetermined time zone, or at a relative time based on user activity.

Any suitably fast network may be used to transmit the files. In GSM (Global System for Mobile Communications) networks, the applet and the file may be transmitted using GPRS (General Packet Radio Service). See http://www.gsmworld.com/technology/gprs/intro.shtml#1.

GPRS, also called 2.5 G, builds on existing second generation GSM networks and is well suited for the delivery of Smart ADDS. However, the present method may be implemented in 3G CDMA (Code Division Multiple Access) or WCDMA (Wideband CDMA) networks without departing from the scope of the present teachings. Hence, the files are transferred as GPRS XML or 3G XML, TDMA (Time Division Multiple Access) or any other popular cellular PCS system and, after receipt, merely sit in the target mobile device's memory until playback.

Next, as shown in FIG. 1, at step 28, in the illustrative embodiment, after the customer receives the schedule and the encoded content, a "message received" screen is displayed on the device at a play-out time specified by the advertiser.

At step 30, the customer plays out the message (which is the Smart ADD). In the best mode, no other handset buttons work until the message (Smart ADD) is played out. Playback on the mobile device is from a successfully downloaded copy buffered (stored) on the handset. This ensures an optimum customer experience, as the ADD is not distorted by problems in transmission. After the file has played, at step 32, the viewer is invited via an onscreen prompt to transfer credit to memory onboard the device 12 (e.g. a SIM card) as an incentive and compensation for accepting and viewing the ad. This transfers credit to their SIM card. In the best mode, the credit is available for a limited duration (e.g. 10 seconds) after the ADD finishes after which it is deleted. This ensures the viewer's active attention to the ADD.

The ADD may also contain a voucher from the advertiser (e.g., a 2 for the price of 1 offer). The voucher, which may be a bar code or other coupon, is automatically stored as a JPEG image on the phone. Hence, the voucher will be with and retrieved by the viewer whenever they go shopping, so long as the device 12 is with them at that time. In addition, the communication capability of the device 12 allows a user to call or text message in response to an advertisement or offer.

In the best mode, the device has an onboard GPS system. Hence, as illustrated at step 34, if the customer desires to do so, the customer can request directions to the nearest store—or respond instantly to the ADD by text or voice call. The user can also forward the ADD to another Smart ADD phone via Bluetooth, Infrared, MMS messaging or other suitable means.

At step 35, comprehensive feedback is provided regarding delivery, playback and subsequent consumer response to the files. This may be effected using the GPRS functionality of a GSM based device. As illustrated in the system block diagram of FIG. 2, information from the device 12 is received via the transceiver 51 and directed by the controller 50 to a database 36. The database 36 may be accessible to advertisers via the web interface 21 and web server 64.

System, Process and an Illustrative Customer Journey:

The device user's journey may be as follows in an illustrative application:

1. The user buys the device, takes it home, and turns it on.
2. The user registers on screen (they can't by-pass this stage).
3. Registration is for the user of the device (the user may not necessarily be the purchaser—the device could be a present)
4. Information required is
   User name
   Date of birth
   Gender
   Home postcode In the illustrative embodiment, the customer has the option of opting-in for Smart Adds via a prompt such as:

"Do you want advance info on new games, movies & music, the coolest files, and some very special deals? Select "yes" and we'll send you:
1. Some free music downloads and special Gizmondo offers.
2. A max of 3 per day of the best files around—Smart files."

5. Followed with a choice of "yes" or "no". This information, plus a unique identification number of the mobile device, is sent by text from the mobile device to the server.
6. The user is then invited to visit a web site and provide info on their entertainment interests.
7. When the user logs into this web page, they give their user name and password—which then links their responses back to their unique id number and thus to the initial registration info—so we can segment those users who provide us with this info by Entertainment Interests, as well as their Gender/Age/Home location gathered from the terminal registration.
8. For those who have opted in:
   Once every 24 hours (programmed to start in the middle of the night), each mobile device automatically logs back to the server to ask "is there a message for me?"
   This happens if the mobile device is either on, or in standby mode. If the device is turned off, it will access the server the next time it is turned on (whatever time of day that happens to be).
   If there is a Smart Add due to be served to that mobile device, there will be an
   XML file ready for it to download.
   The XML file downloads, and it contains the transmission schedule for that mobile device (which ad, to play out when), along with the location in our server of any copy associated with that transmission schedule. The schedule can be for as far in advance as we choose to make it (the next week's files or just the next day's files).
   Now the mobile device knows which file copy it needs, it goes to the right location in the server, finds the copy, and downloads it over GPRS onto the device, saving it in the on-board memory (not the user's SD card).
   Assume the file has a play-out window of 9.00 to 12.00 the next day. At 9.00, the device makes a "bleep"—the sound of a test message arriving.
   If the device is on the main menu page, then the next button that the user has to press is the "play message" button No other button works until it is pressed. The file has to play through completely (again, no other button works).
   If at 9.00 in this example, the user was doing something on the device (sending a text/listening to music etc.) then they get the text alert sound-but are not disturbed in their activity. However, when they next go back to the main menu . . . or if they try to turn off the device . . . they find they have to play the message/ad first—and no other buttons work until it has played through.
   Once the file has played through the device, the user has the option of saving the ad. This is probably best done as the end frame of the file itself. The ability to save a file is required in order that bar codes/promos can work, and so that the user can forward the file if they choose.

The next time that the mobile device logs into the server it reports back regarding the files which were successfully received by the device.

In the illustrative embodiment, feedback is produced to provide information on key aspects of the process. For example, the next time the mobile device logs into the server it might report back on:

a. Registration information of the mobile device;
b. Previous schedule download time;
c. Each Smart Add download time and success information;
d. Playback of each Smart Add;
e. Played ok (including time of playback);
f. Expired before playback could be attempted;
g. Users action regarding Smart Adds;
h. Smart Add was saved for future viewing;
i. Smart Add was discarded after playback; and
j. Smart Add was viewed again.

In accordance with the present teachings, the advertiser is provided with a transmission report. The only parts of this process that the user should be aware of after opting-in and providing their web based "entertainment interests" should be from the "bleep" of the text message arriving, through to the saving (or not) of the ad. The rest should be invisible to the user.

The transmission report will allow the advertiser to know:
which files were successfully received by the device
which files successfully played through the device—and at what time
which files did the user save?
the report should provide data regarding:
i) whether the file contained an SMS number that the user can respond to;
ii) whether the device sent an SMS to that designated number; and
iii) whether the user accessed the GPS—"find my nearest store" to find that advertiser's store locations.

If the advertiser has a "find my nearest store" option at the end of the ad, the process for the user would ideally be that they can go to the store listing as simply, easily and quickly as possible.

The solution might be:
a. user selects 'find nearest store'
b. this then interrogates the mapping database and returns a map plus routing information.

Thus, the present invention has been described herein with reference to a particular embodiment for a particular application. Those having ordinary skill in the art and access to the present teachings will recognize additional modifications, applications and embodiments within the scope thereof. For example, the files may be transmitted to a fixed or stationary platform without departing from the scope of the present teachings.

It is therefore intended by the appended claims to cover any and all such applications, modifications and embodiments within the scope of the present invention.

Accordingly,

What is claimed is:

1. A system for transmitting, receiving and outputting multimedia content including:
   a transmitter for transmitting multimedia content via a computer on a network, said content containing audio as well as video content;
   a mobile computing and communications receiver for automatically receiving said content via said first network, said receiver having a data channel for receiving said content and a cellular channel for receiving voice communication; and
   an applet running on said device adapted for:
      automatically playing back said content on said device at a predetermined time or place subject to the state of the device with respect to a use thereof by a user,
      confirming that the user viewed the content,
      managing data on said device including a credit earned as a result of viewing said content on said device,
      storing said credit on a sim card on said device,
      sending said data to a source of said multimedia content regarding the viewing thereof,
      whereby the credit may be automatically applied to an account for said user.

2. The system of claim 1 wherein said data includes a schedule for displaying said content.

3. The system of claim 1 wherein said data includes instructions relating to a playout of said content on said device.

4. The system of claim 1 wherein said computer is a server adapted to transmit said applet to said device.

5. The system of claim 1 wherein said content is encoded.

6. The system of claim 5 wherein said content is compressed.

7. The system of claim 6 wherein said applet deciphers said content.

8. The system of claim 1 wherein said applet includes system for activating said device from a low power state on receipt of a message from said computer via said network.

9. The system of claim 1 further including system for transmitting said credit to said device.

10. The system of claim 1 wherein said credit is generated after said data is generated on said device indicating that a user has responded to a prompt within a predetermined time frame after display of said content on said device.

11. The system of claim 1 further including system for transmitting a voucher to said device.

12. The system of claim 11 wherein said voucher is a coupon that contains a bar code.

13. The system of claim 1 wherein said device includes a cellular transceiver.

14. The system of claim 1 further including system for scheduling the transmission of said content.

15. The system of claim 1 further including system for wherein said applet includes system for managing playback of said content under predetermined conditions.

16. The system of claim 15 wherein one of said conditions is use of said device by a user.

17. A system for transmitting, receiving and outputting multimedia content including:
   a transceiver for transmitting multimedia content via a computer on a network, said content containing audio as well as video content;
   a mobile computing and communications device for automatically retrieving said content and automatically playing back said content at a predetermined time; said device including a receiver having a first data channel for receiving said content and a cellular channel for receiving voice communication; and
   an applet running on said device adapted for:
      automatically playing back said content on said device at a predetermined time or place subject to the state of the device with respect to a use thereof by a user,
      confirming that the user viewed the content,
      managing data on said device including a credit earned as a result of viewing said content on said device, storing said credit on a sim card on said device,
sending said data to a source of said multimedia content regarding the viewing thereof whereby the credit may be automatically applied to a bill for said user's cellular communications charges.

18. A method for transmitting, receiving and outputting multimedia content including:
transmitting multimedia content via a computer on a network, said content containing audio as well as video content;
automatically activating a mobile computing and communications platform from a low power state;
automatically retrieving said content on said mobile computing and communications device, said device including a receiver having a first data channel for receiving said content and a cellular channel for receiving voice communication;
automatically playing back said content on said device at a predetermined time or place subject to the state of the device with respect to a use thereof by a user,
confirming that the user viewed the content,
managing data on said device including a credit earned as a result of viewing said content on said device,
storing said credit on a sim card on said device,
sending said data to a source of said multimedia content regarding the viewing thereof,
whereby the credit may be automatically applied to an account for said user.

* * * * *